United States Patent
Smythe, Jr.

(10) Patent No.: US 7,958,923 B2
(45) Date of Patent: Jun. 14, 2011

(54) DRYWALL TRIM AUTO-FOLDER, MASTIC APPLICATOR AND CUTTER

(76) Inventor: Timothy Smythe, Jr., Bend, OR (US)

( * ) Notice: Subject to any disclaimer, the term of this patent is extended or adjusted under 35 U.S.C. 154(b) by 1229 days.

(21) Appl. No.: 11/633,086

(22) Filed: Nov. 30, 2006

(65) Prior Publication Data

US 2007/0151181 A1    Jul. 5, 2007

Related U.S. Application Data

(60) Provisional application No. 60/742,797, filed on Dec. 6, 2005.

(51) Int. Cl.
*B44C 7/04*    (2006.01)
*E04B 2/00*    (2006.01)

(52) U.S. Cl. ......... 156/526; 156/575; 156/578; 156/579

(58) Field of Classification Search .................. 156/526, 156/574, 575, 577, 579, 578
See application file for complete search history.

(56) References Cited

U.S. PATENT DOCUMENTS

| | | | | |
|---|---|---|---|---|
| 2,400,698 A | | 5/1946 | Lissa | 270/86 |
| 3,178,978 A | * | 4/1965 | Eisenman | 83/208 |
| 3,392,895 A | * | 7/1968 | Ellner et al. | 226/138 |
| 3,435,251 A | * | 3/1969 | Ellner | 307/115 |
| 3,496,698 A | | 2/1970 | Wichmann | 53/117 |
| 3,558,030 A | * | 1/1971 | Hempel et al. | 226/135 |
| 3,750,728 A | | 8/1973 | Stark | |
| 4,127,434 A | * | 11/1978 | Lass | 156/526 |
| 4,652,331 A | * | 3/1987 | Plasencia | 156/526 |
| 5,730,819 A | | 3/1998 | Retti | 156/66 |
| 6,449,855 B1 | * | 9/2002 | Louis | 33/286 |
| 6,565,252 B2 | * | 5/2003 | Dillinger et al. | 366/13 |

OTHER PUBLICATIONS

PCT Preliminary Report on Patentability PCT/US07/024420 Jun. 11, 2009.

* cited by examiner

*Primary Examiner* — Mark A Osele
(74) *Attorney, Agent, or Firm* — Clifford Kraft

(57) ABSTRACT

A drywall trim application device that can hold a large role of drywall flex corner trim material and, as the material is being dispensed, pre-crease or form the material for use on an inside or outside corner, or any angle within the range of the trim material, apply a mastic material (drywall mud, adhesive or any other bonding medium) to the flex trim material, and cut the material at any desired length automatically. Measurements may be either input by hand or down loaded from an electronic measurement tool into this device. This invention can generally store multiple measurements such as length and angles, measure the length of flex trim material as it is dispensed from the device, crease the material, apply predetermined amount of mastic, and automatically cut the flex trim material to each length previously input.

39 Claims, 4 Drawing Sheets

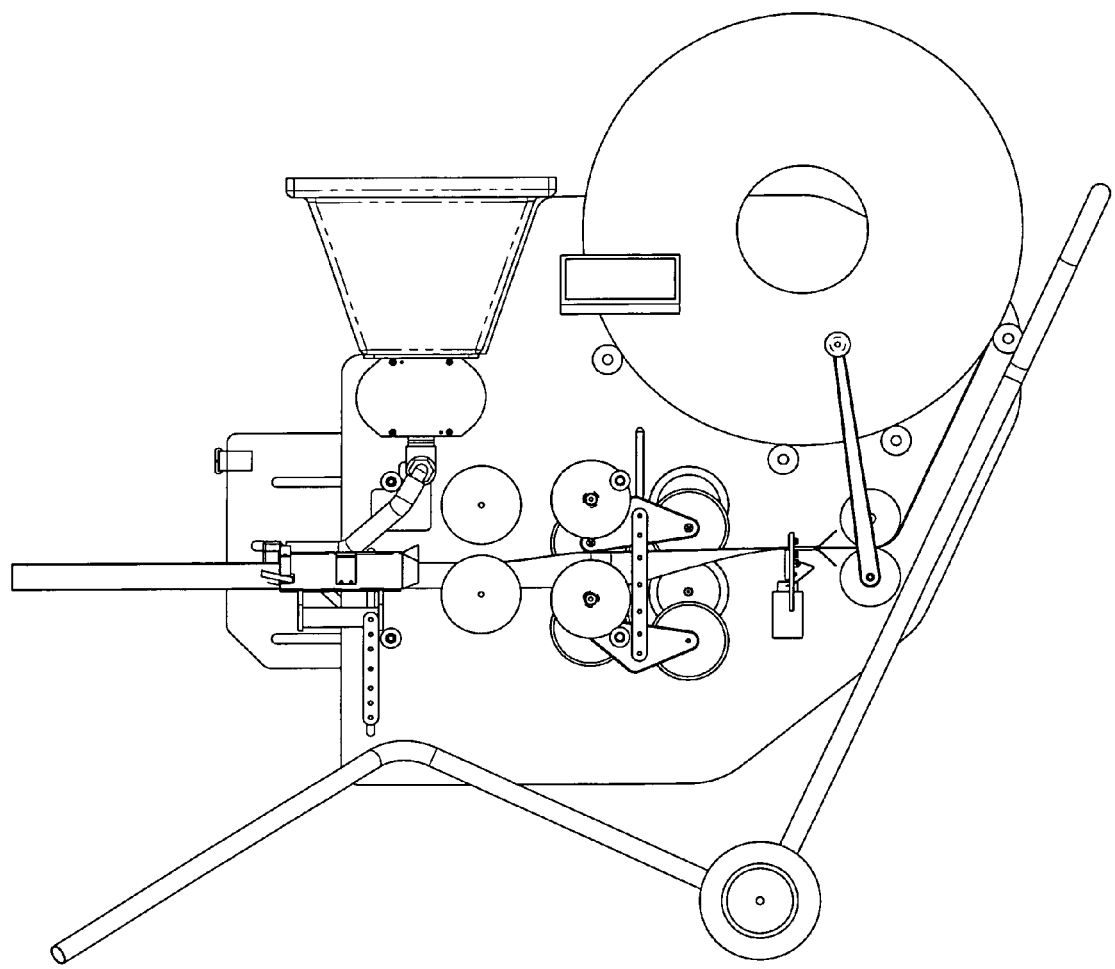
FUGURE 4

_US 7,958,923 B2_

DRYWALL TRIM AUTO-FOLDER, MASTIC APPLICATOR AND CUTTER

This application is related to and claims priority from U.S. Provisional Patent application No. 60/742,797 filed Dec. 6, 2005. Application 60/742,797 is hereby incorporated by reference.

BACKGROUND

1. Field of the Invention

The present invention relates generally to the field of drywall corner trim application and more particularly to a device that will hold a large role of drywall flex corner trim material and, as the material is being dispensed, pre-crease the material for use on an inside or outside corner, apply a mastic material, adhesive, or adhesive activation material and cut the material at any desired length.

2. Description of the Prior Art

It is known in the industry to use various outside, inside and flex corner trim materials in finishing sheet rocked walls (drywall). These various materials have specific purposes such as for an inside corner or an outside corner, or they can be flexed by hand to cover various corner angles (off angles). This requires the installer to purchase, stock, and carry each of these different products, in various lengths, with them from job to job.

In using all of these different corner trim materials the installer has to apply a mastic material, usually drywall mud, some adhesive or some adhesive activation material such as water for water activated adhesives, to the corner prior to applying the trim material, or otherwise mechanically fasten it into place either with nails, staples, screws or otherwise. This is usually done by hand with various tools. All of these materials must also be cut to length, usually by hand, during installation at the job site which creates much wasted corner trim material.

It would be advantageous to have a device that will do many or all of these operations automatically at the time of installation making the installers work easier, faster, more efficient and with less waste material.

SUMMARY OF THE INVENTION

The present invention relates to a device that can hold a large role (possible 500 feet of material or more) of drywall flex corner trim material and, as the material is being dispensed, pre-crease or form the material for use on an inside or outside corner, or any angle within the range of the trim material, apply a mastic material (drywall mud, adhesive or any other bonding medium) to the flex trim material, and cut the material at any desired length automatically. Measurements may be either input by hand or down loaded from an electronic measurement tool into this device. This invention can generally store multiple measurements such as length and angles, measure the length of flex trim material as it is dispensed from the device, crease the material, apply predetermined amount of mastic, and automatically cut the flex trim material to each length previously input. The user is then free to apply one piece of flex trim material after another to multiple drywall corners on a job site. Moving the flex trim material through the device may be powered by hand, pulling the flex trim material out, or powered by electric motors so all the user needs to do is support the flex trim material as it comes out of the device.

DESCRIPTION OF THE FIGURES

FIG. 4 shows an embodiment of the invention configured to form the flex trim material for application to an outside corner on the job site.

Several drawings and illustrations have been presented to aid in the understanding of the present invention. The scope of the present invention is not limited to what is shown in the figures.

DESCRIPTION OF THE INVENTION

Figure 1:
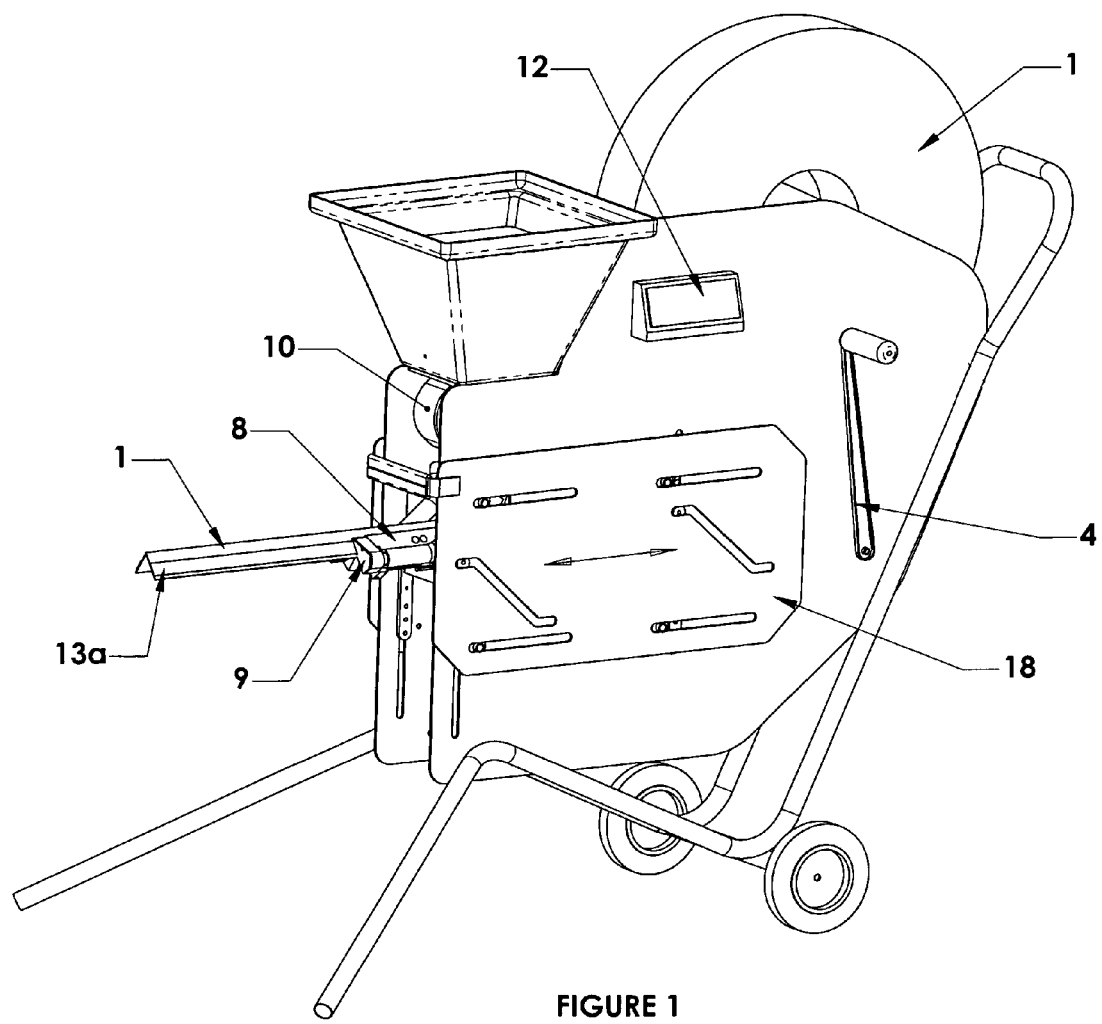
FIG. 1 shows a right side view of an embodiment of the present invention.

Turning to FIG. 1, the right side view of the an embodiment of the present invention can be seen. A large roll of trim material (1) can be held in the device so it can rotate freely as the material is fed off the roll and moved through the machine. The material is routed to a set of rollers attached to the advance lever (4). Rotating the advance lever (4) rotates these internal rollers which pull the trim material (1) off the large roll and feed it further into the machine. A cam assembly (18) can be moved left or right in this figure to adjust the position of the folder frame (20) to set the angle to which the trim material (1) will be folded, or pre-creased, as it is moved through the device. A pump (10) and applicator(9) assembly applies a mastic to the trim material (1), measures & cuts to the trim material (1) to length, and the user places it onto the drywall corner. The cam assembly (18) may be replaced by any mechanical means to locate the folder frame (20) such as air, or electrical actuators. Also visible in FIG. 1 is a mastic applicator guide (8) and the mastic applicator (9). The end of the trim material (1) can be seen as it exits the device. Note that it is folded (or creased) and mastic material Beads (13a) have been applied to the trim material (1) for application onto an inside corner. A control unit (12) can be seen mounted to the side of the device. This control unit (12) can act as an input/output device for the user, measure the length of trim material (1) moving through the device, power and activate the cutter (5) as determined by the input measurements, and it may power and control the mastic pump (10) and drive wheels (2,3) if they are motor driven. A cam assembly (18) can also be seen.

Figure 2:
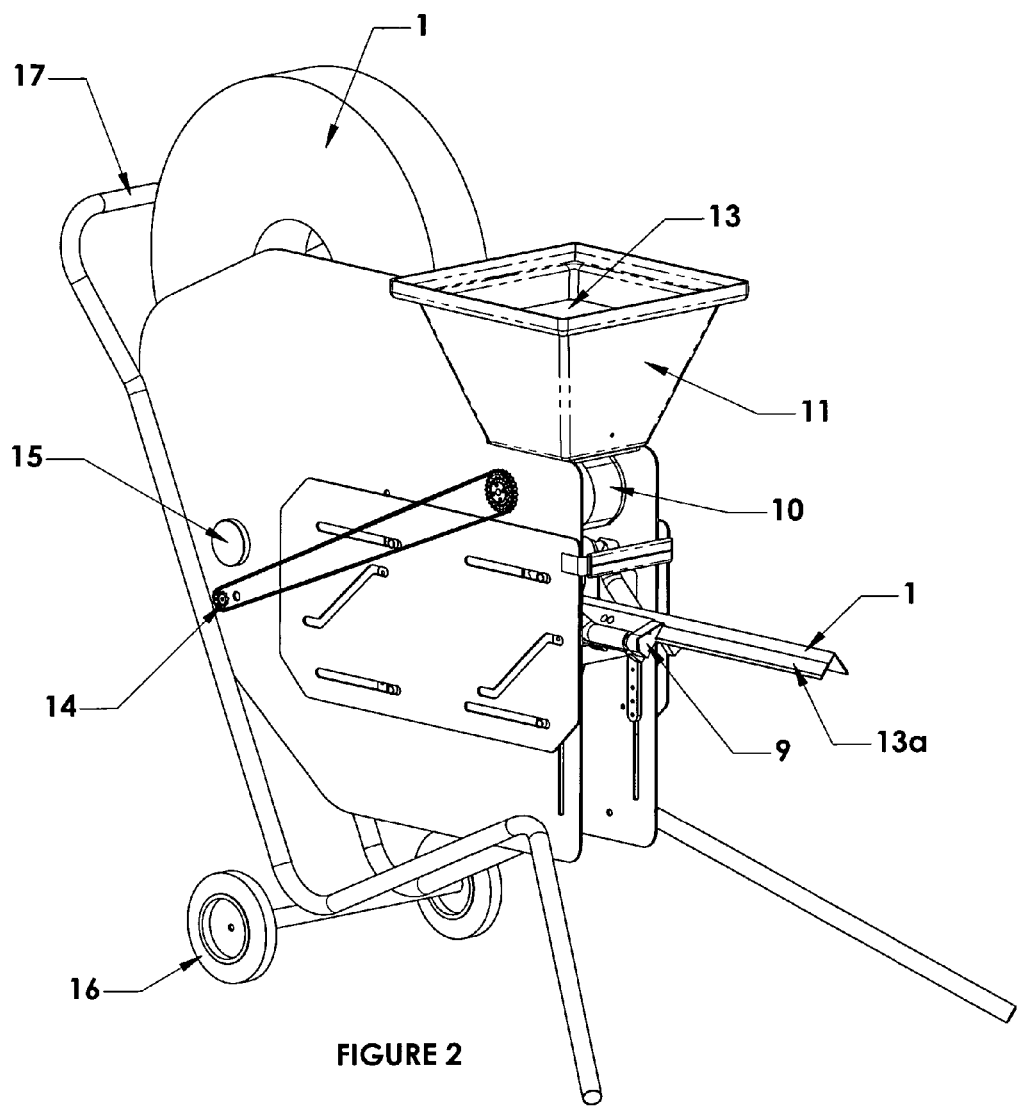
FIG. 2 shows a left side view of the embodiment of FIG. 1.

FIG. 2 view shows a left side view of the embodiment of FIG. 1. A Reservoir (11) normally sits on top of the mastic pump (10). The Reservoir (11) can be filled with, and supply the mastic pump (10) with, the mastic material (13). The mastic pump (10) normally meters and pumps the mastic material (13) to mastic applicators (9). The mastic pump (10) may be mechanically driven by a sprocket & chain arraignment (14), as shown, or by an electric motor controlled and powered by the control unit (12), not shown. A encoder (15), which can be driven by rollers riding against the flex trim material (1) as it moves through the device, can be used in conjunction with the control unit (12) to measure the length of the trim material (1) that has moved through the device and the speed with which it is moving through the device. Any method of measuring the length and/or speed of the material is within the scope of the present invention. The control unit (12) can use this information to determine when to cut the trim material (1) to produce pieces of trim material (1) the desired length, and optionally control and drive the mastic pump (10) with an electric motor so as to apply the same size of mastic bead (13a) to the trim product (1) regardless of how fast the trim material (1) is moving through the device. The control unit can also, optionally, to control and drive the bottom drive roller (3) using a motor. Also shown in FIG. 2 are wheels (16) and a handle (17) used to easily move the device around the job site or from site to site.

Figure 3:
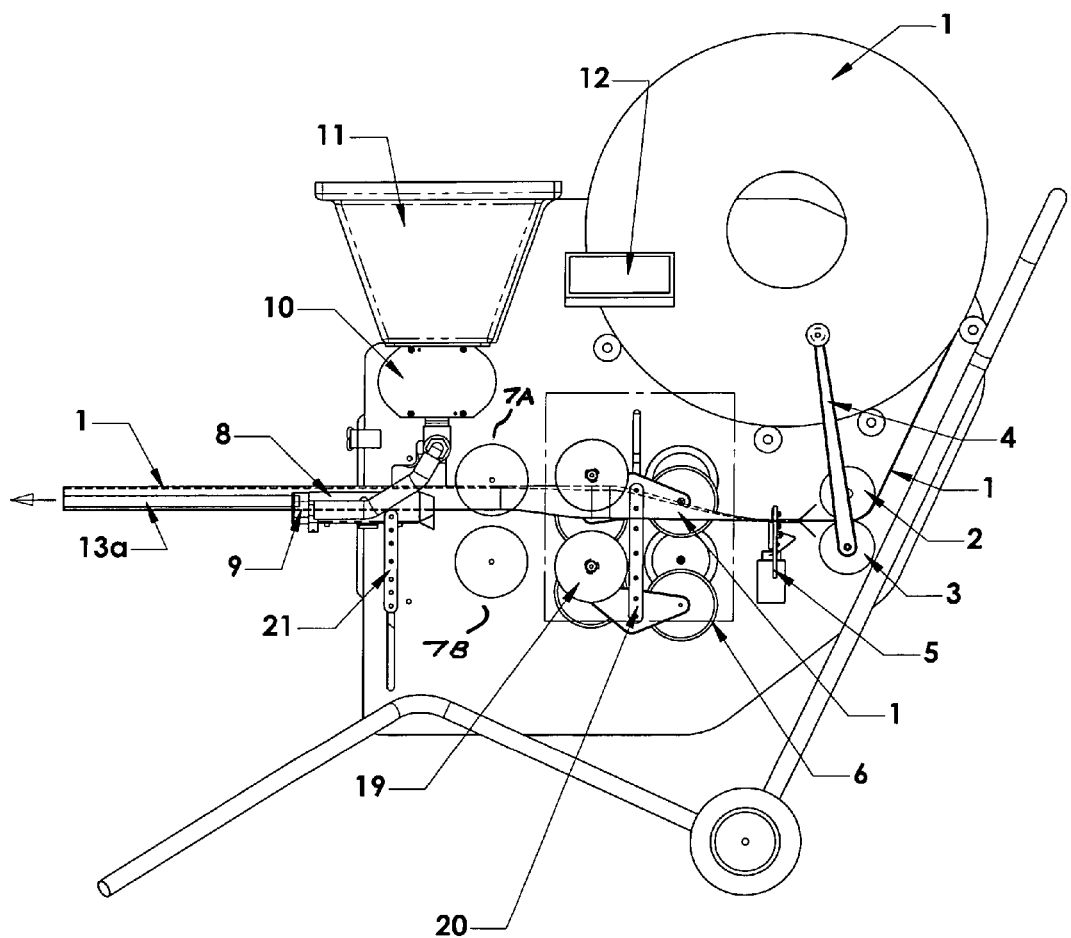
FIG. 3 shows an embodiment of the invention configured to form the flex trim material for application to an inside corner on the job site.

FIG. 3 shows a right side view of an embodiment of the present invention with the cam assembly (18) and part of the guide wheels (19) removed so that the internal parts of this embodiment of the device may be seen. Generally, in this view, the product moves from right to left through the device as it is being dispensed as indicated by the arrow on the left side of the view. The bottom drive roller (3) is normally mechanically linked to the advance lever (4) such that when the advance lever (4) is rotated counter clockwise it mechanically engages the bottom drive roller (3) to rotate in the same direction. When the advance lever (4) rotates clockwise the bottom drive roller (3) is mechanically disengaged and free to continue rotating in the counterclockwise direction. The top drive roller (2) is normally directly above the bottom drive roller (3) in such a way that the two rollers push against each other. The bottom drive roller (3) may be driven by an electric motor and controlled by the control unit (12).

The trim material (1) can be routed between the top drive roller (2) and the bottom drive roller (3) and is normally forced by friction to move in the direction the rollers are rotated. When the advance lever (4) is rotated counter clockwise, the trim material (1) is pulled off of the large roll and forced through the cutter (5) and into the folder (6).

The folder (6) is an arrangement of guide wheels (19) which can be mounted on a folder frame (20). The folder frame (20) can be mechanically linked to the cam assembly (18) such that when the cam assembly (18) is moved left or right the folder frame (20) is forced up or down. The up and down movement of the folder frame (20) positions the guide wheels (19) so that as the trim material (1) moves through the folder (6) and the guide wheels (19) will fold the trim material (1). The position of the guide wheels (19) generally determines the angle to which the trim material (1) is folded.

As the trim material (1) proceeds right to left through the folder (6), and is folded, it exits the folder (6) and moves past a upper guide roller (7A) or lower guide roller (7B) depending on whether the trim material (1) is being folded to an inside or outside angle respectively. These guide rollers (7) guide the trim material (1) into a mastic applicator guide (8). The mastic applicator guide (8) normally has a left and right side and hinges at the center and is attached to the mastic applicator guide frame (21). The mastic applicator guide frame (21) is normally mechanically linked to the cam assembly (18) and moves with the folder frame (20) as the cam assembly (18) is moved left or right. This mechanical action may be achieved by any alternate means for example air or hydraulic cylinders.

The mastic applicator guide (8) guides the folded flex trim material (1) past the mastic applicators (9). The mastic applicators (9) are attached to the applicator guide (8) and therefore are normally positioned properly to apply mastic bead (13a) to the trim material (1) regardless of what angle the trim material (1) is being folded at. There is normally one mastic applicator (9) on each side of the trim material (1). As the trim material (1) is dispensed (to the left in this view) two mastic beads (13a) of mastic material (13) are applied to it. One bead (13a) of mastic material (13) can be applied to each side of the trim material (1).

The rate of flow of mastic material (13) out of the mastic applicators (9) is normally determined by how fast the mastic pump (10) rotates, which is determined by how fast the trim material (1) is moving through the device. In this way, the same size of mastic bead (13a) is applied to the trim material (1) regardless of how fast the trim material (1) is moving through the device. This results in an exact amount of mastic material (13) being applied to the trim material (1) so there is very little cleanup or waste.

FIG. 3 shows the device adjusted to form the flex trim material for application to an inside corner on the job site.

FIG. 4 shows the device adjusted to form the flex trim material for application to an outside corner on the job site.

Several descriptions and illustrations have been provided to better aid in understanding the present invention. One skilled in the art will realize that there are numerous changes and variations possible without departing from the spirit of the invention. Each of these changes and variations is within the scope of the present invention.

I claim:

1. A drywall trim preparation device that prepares drywall trim for later application to a wall comprising: a drywall trim roll; a feed mechanism coupled to said drywall trim roll, wherein said feed mechanism pulls drywall trim from said roll moving it through said device; a folder mechanism adapted to fold or crease said drywall trim longitudinally to an adjustable programmed angle; a mastic applicator adapted to coat at least one side of said trim with mastic; a cutter that cuts said trim to an adjustable programmed length.

2. The drywall trim preparation device of claim 1 wherein said folder mechanism folds said trim into an outside corner.

3. The drywall trim preparation device of claim 1 wherein said device is fully automatic, preparing multiple pieces one after another or partially automatic preparing one piece at a time on command.

4. The drywall trim preparation device of claim 1 wherein said drywall trim is constructed of a rigid or semi rigid core with an outer surface prepared to accept a mastic, texture, paint or other finishing material.

5. The drywall trim preparation device of claim 1 wherein said drywall trim is constructed of a rigid or semi rigid core with an inner surface prepared to accept a bonding medium for adhering to the drywall corner.

6. The drywall trim preparation device of claim 1 wherein said mastic applicator can apply adhesives to a surface of said drywall trim, or a medium that activates an adhesive already present on a surface of the drywall trim.

7. The drywall trim preparation device of claim 1 wherein said device can store multiple measurements and angles.

8. The drywall trim preparation device of claim 1 wherein said device can dispense a piece of folded, coated and measured trim material automatically or on command for later application to a wall.

9. The drywall trim preparation device of claim 1 wherein said device can dispense a piece of folded, coated and measured trim material in a manual mode.

10. The drywall trim preparation device of claim 1 wherein said mastic applicator supplies drywall joint compound to a surface of said drywall trim.

11. A drywall trim preparation device comprising:
a drywall trim roll holder; a feeder mechanism feeding drywall trim from a drywall trim roll through said device; a forming mechanism; a mastic applicator; a cutter; wherein said drywall trim is fed into said forming mechanism, said mastic applicator and said cutter so that said drywall trim is formed to an adjustable predetermined angle longitudinally, coated with mastic and cut to an adjustable predetermined length.

12. The drywall trim preparation device of claim 11 wherein said trim material has a metal core.

13. The drywall trim preparation device of claim 11 wherein said trim material has a plastic core.

14. A drywall trim preparation device preparing drywall trim strips for later installation on a wall suitable for finishing drywall joints and corners comprising: a control unit, a source of drywall trim material; a feed mechanism coupled to said source wherein said feed mechanism moves said trim material from said source through said device; a forming mechanism adapted to shape said material longitudinally to a programmed angle chosen by a user; an applicator adapted to prepare at least one side of said material for installation, and a cutter that cuts said material to said predetermined programmed length chosen by said user.

15. The drywall trim preparation device of claim 14 wherein said forming mechanism folds said material into an outside corner.

16. The drywall trim preparation device of claim 14 wherein said device is fully automatic, partially automatic or manual.

17. The drywall trim preparation device of claim 14 wherein said device can apply adhesives to a surface of said material, or a medium that activates an adhesive to on a surface of said material.

18. The drywall trim preparation device of claim 14 wherein said device can dispense a piece of folded, coated and measured material manually, semi-automatically, automatically, or on command.

19. The drywall trim preparation device of claim 14 wherein said feed mechanism further includes a drive system that pulls and/or pushes said drywall trim material through the device.

20. The drywall trim preparation device of claim 14 wherein said device can be adjusted to operate at a plurality of speeds.

21. The drywall trim preparation device of claim 14 wherein said applicator can be adjusted to supply an adjustable predetermined amount of mastic material to at least one surface of said material.

22. The drywall trim preparation device of claim 14 wherein said control unit is adapted to receive and store a plurality of lengths and/or angles specified by a user.

23. The drywall trim preparation device of claim 14 further comprising a wireless remote control to start, stop, and/or control the device.

24. The drywall trim preparation device of claim 14 further comprising a wireless remote electronic measuring tool for providing angular or length measurements into said device, said measurements taken by an installer.

25. The drywall trim preparation device of claim 14 further comprising a remote electronic measuring tool that communicates with said control unit wirelessly or wired, and supplies a measured length and a measured angle to said control unit.

26. The drywall trim preparation device of claim 14 wherein said mastic applicator supplies drywall joint compound to a surface of said material.

27. A system for forming, cutting and preparing drywall joint or corner finishing material for later application to a wall comprising:
a unit, including a control unit, a feed mechanism, a former, an applicator and a cutter; and wherein,
said control unit receives and stores a plurality of measurements;
said feed mechanism moves said finishing material through the unit for an adjustable programmed length;
said former shapes said finishing material to an adjustable programmed angle according to a stored value;
said applicator prepares said finishing material for bonding to the drywall corner;
said cutter cuts said finishing material to predetermined lengths according to a stored value for later application to said corner.

28. The system for forming, cutting and preparing drywall joint or corner finishing material of claim 27 further comprising an electronic measuring tool that communicates measurements wirelessly to said control unit.

29. The system for forming, cutting and preparing drywall joint or corner finishing material of claim 28 wherein said electronic measuring tool communicates lengths and/or angles to said control unit.

30. The system for forming, cutting and preparing drywall joint or corner finishing material of claim 27 further comprising an electronic measuring tool that communicates angular or length measurements wirelessly or by wire with said control unit.

31. The system for forming, cutting and preparing drywall joint or corner finishing material of claim 27 further comprising a remote device communicating with said control unit to start, stop, and/or control said system.

32. The system for forming, cutting and preparing drywall joint or corner finishing material of claim 27 wherein said material is a coated product.

33. The system for forming, cutting and preparing drywall joint or corner finishing material of claim 27 wherein said material is supplied on a roll.

34. The system for forming, cutting and preparing drywall joint or corner finishing material of claim 27 wherein said applicator applies drywall mastic to at least one side of said material.

35. The system for forming, cutting and preparing drywall joint or corner finishing material of claim 27 wherein said applicator, applies adhesives, or a medium that activates a bonding material already present on the surface of the drywall finishing material.

36. The system for forming, cutting and preparing drywall joint or corner finishing material of claim 27 further comprising a mastic pump.

37. The system for forming, cutting and preparing drywall joint or corner finishing material of claim 27 wherein said system can be operated fully automatically, partially automatically or manually.

38. A system for preparing drywall joint or corner finishing material for later installation comprising:
a unit including, a control unit, a feed mechanism, a former and a cutter; and wherein,
said control unit receives and stores a plurality of measurements supplied by a user;
said feed mechanism moves said finishing material through the unit an adjustable predetermined length;
said former shapes said finishing material according to a stored angular value;
said cutter cuts said finishing material to adjustable predetermined lengths according to a stored value supplied by said user.

39. A system for forming and preparing drywall joint or corner finishing material comprising:
a unit including a supply of mastic, a control unit, a feed mechanism, a former and an applicator; and wherein,
said control unit receives and stores a plurality of measurements;
said feed mechanism moves said finishing material through the unit to an adjustable predetermined length;
said former shapes said finishing material according to a programmed angular value;
said applicator prepares said finishing material for later bonding to the drywall joint or corner.

* * * * *